Dec. 27, 1966   L. C. FRAZIER   3,294,143
RESTRICTIVE TREAD COMPONENT
Filed April 28, 1965   4 Sheets-Sheet 4
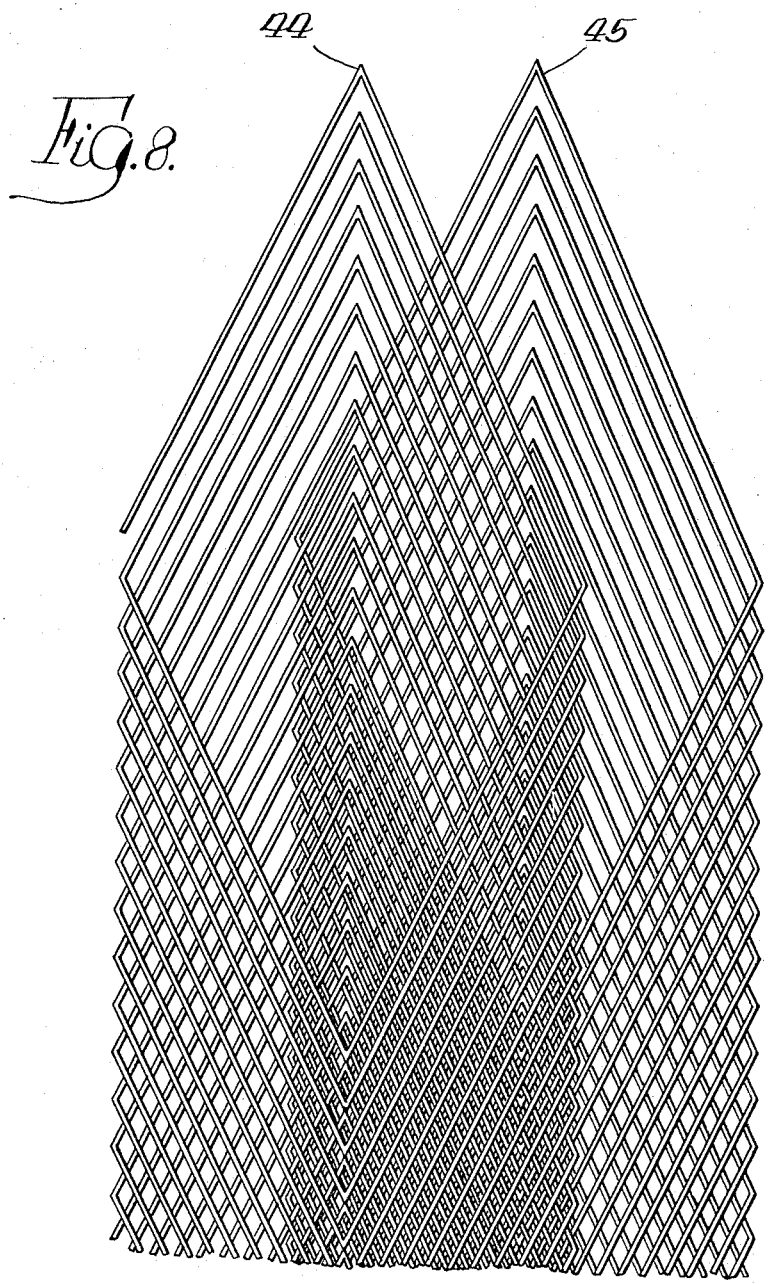
Inventor:-
Larry C. Frazier, United States Patent Office 3,294,143
Patented Dec. 27, 1966

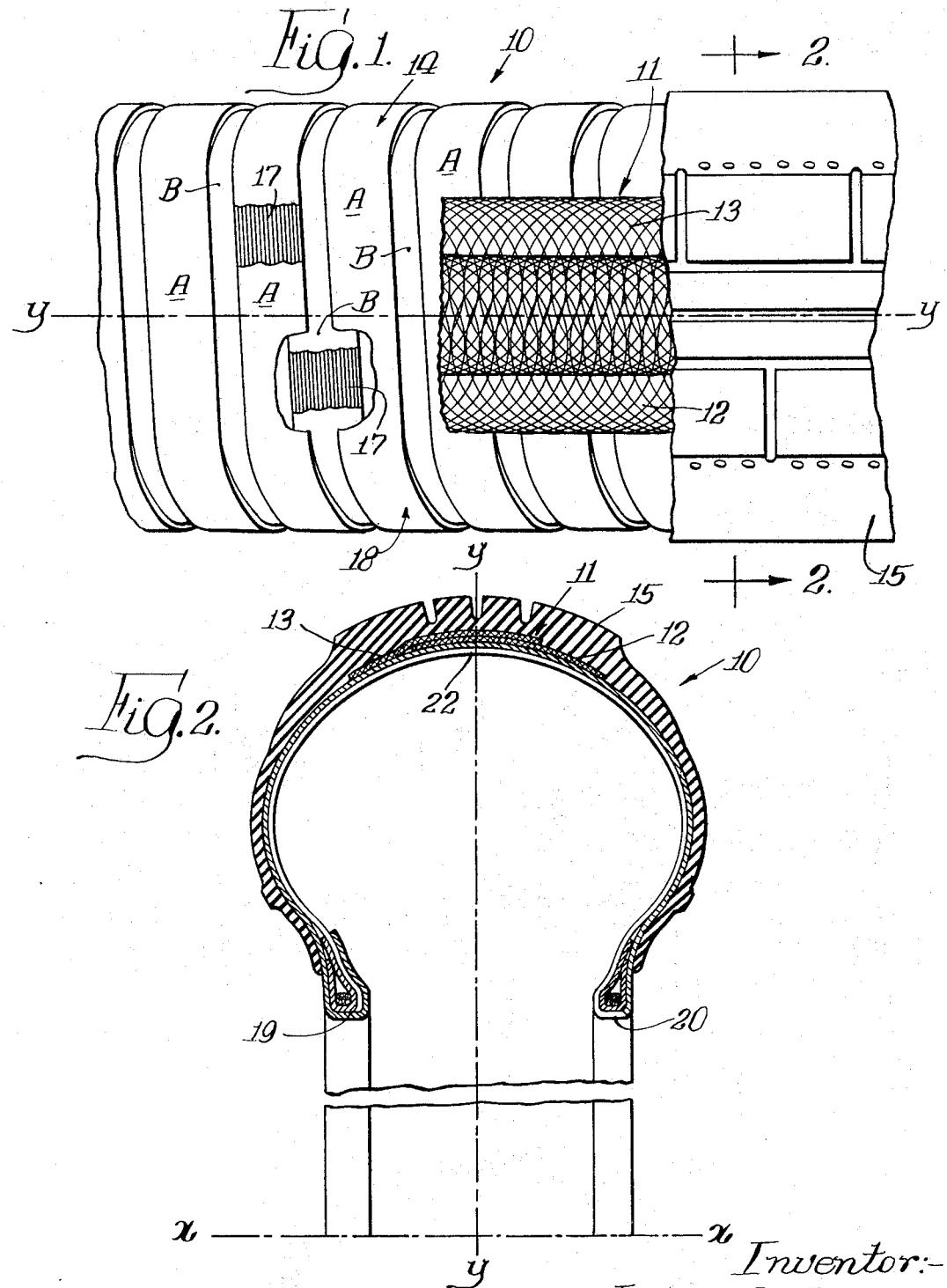

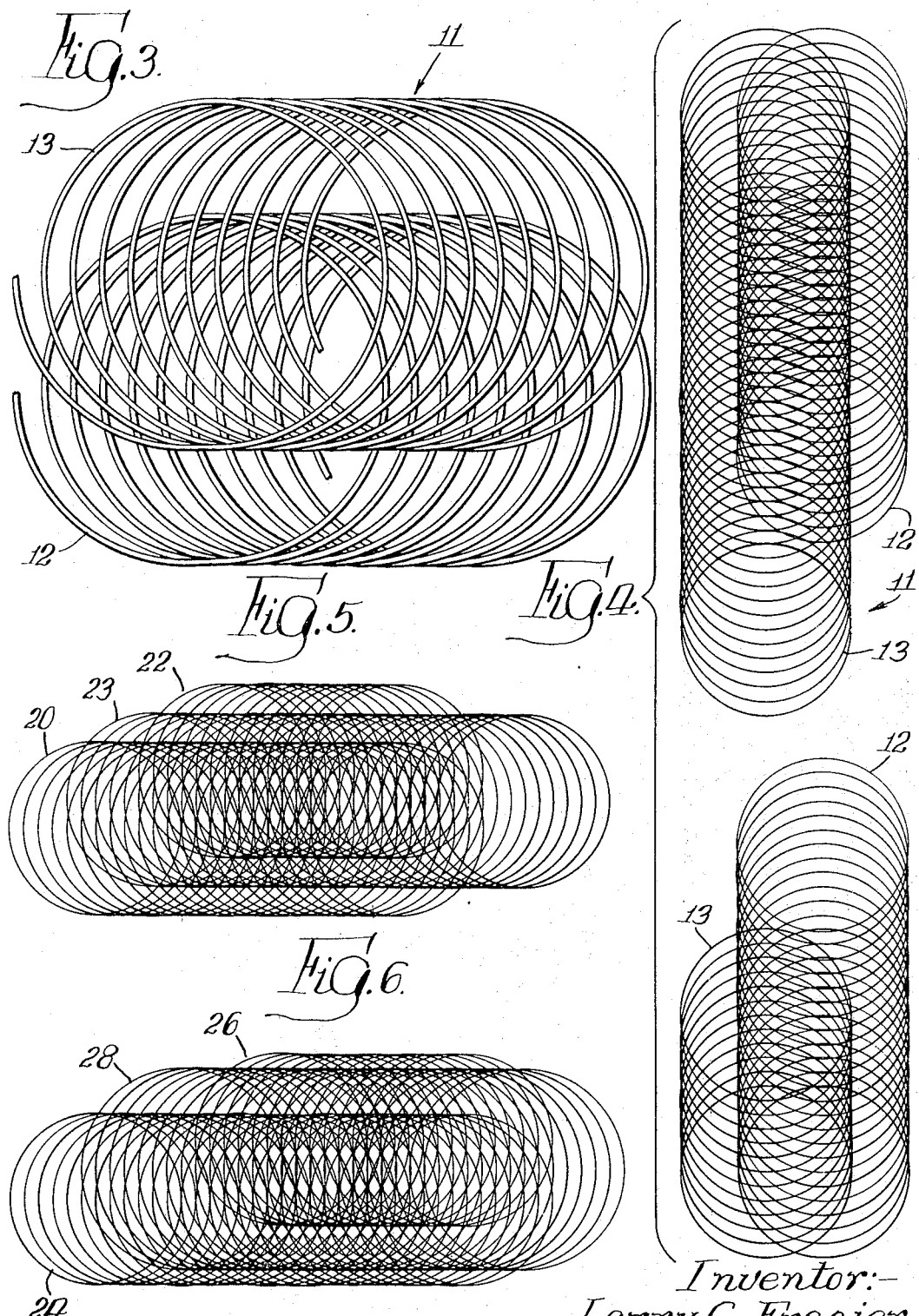

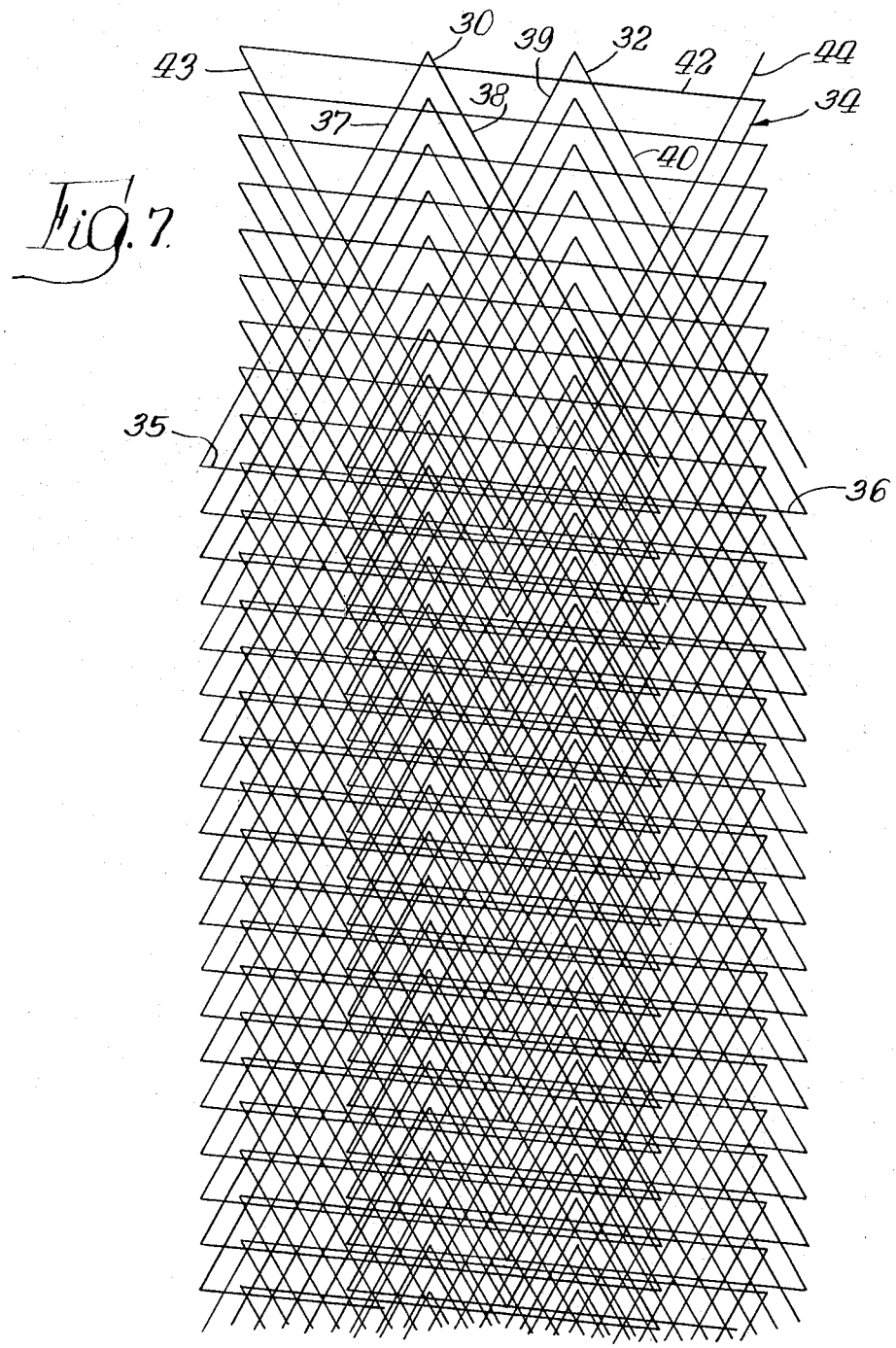

3,294,143
RESTRICTIVE TREAD COMPONENT
Larry C. Frazier, Prescott, Ariz., assignor to National-Standard Company, Niles, Mich., a corporation of Delaware
Filed Apr. 28, 1965, Ser. No. 451,503
11 Claims. (Cl. 152—361)

The present invention relates to restrictive tread components or cincture structures for use between the carcass and tread of a pneumatic tire.

A restrictive tread component or cincture structure in the art today is required to provide against tire carcass growth and satisfactory road engagement of the tread in a radial or zero angle tire which is characterized by having its carcass reinforced by cords lying in planes extending radially outwardly or substantially so of the axis of rotation of the tire. While the restrictive tread components of the present invention have particular utility in radial angle tires, they may also be utilized in conventional tires having carcasses formed from bias cut tire building materials.

It is known in the art to provide restrictive tread components composed of one or more plies comprising reinforcing cord means lying in a plurality of circumferentially successive and serially connected overlapping convolutions of various configurations such as circular, triangular and diamond. In such known restrictive tread components, the convolutions may be readily distorted and fail to adequately prevent tire carcass growth at portions of the crown thereof lying at opposite sides of a mid-plane extending perpendicular to the axis of rotation of the tire and centrally between the tire beads, in that in the known restrictive tread components the crossing portions of the reinforcing cord means are at a minimum at such portions of the crown of the carcass and afford no effective reinforcement thereat.

Accordingly, it is an object of the present invention to provide a restrictive tread component which avoids the above noted disadvantage of known structures by providing a first ply defined by reinforcing cord means lying in a plurality of circumferentially successive and serially connected overlapping convolutions, a second annular ply defined by second cord means lying in a plurality of circumferentially successive and serially connected overlapping convolutions, and in which such first and second plies are disposed in superposed offset lateral relation with respect to each other whereby such plies at the aforementioned mid-plane of the carcass provide a strong reinforcement defined by multiple crossing portions of the reinforcing cord means of both plies.

The above and other objects and advantages of the invention will appear from the following detailed description of certain preferred embodiments of the invention:

Now in order to acquaint those skilled in the art with the manner of constructing restrictive tread components in accordance with the principles of the present invention, there shall be described in conjunction with the accompanying drawings certain preferred embodiments of the invention.

In the drawings:

FIGURE 1 is a plan view of a portion of a pneumatic tire broken away to show one form of restrictive tread component of the invention embodied between the carcass and tread of the tire;

FIGURE 2 is a vertical sectional view of the tire of FIGURE 1 with the view being taken substantially along the line 2—2 of FIGURE 1 looking in the direction indicated by the arrows;

FIGURE 3 is a plan view showing a portion of the restrictive tread component embodied in the tire of FIGURES 1 and 2;

FIGURE 4 is a diagrammatic plan view of the restrictive tread component of FIGURE 3;

FIGURE 5 is a diagrammatic plan view showing another form of restrictive tread component of the present invention;

FIGURE 6 is a diagrammatic plan view showing still another form of restrictive tread component of the present invention;

FIGURE 7 is a diagrammatic plan view of a portion of another restrictive tread component of the present invention embodying plies having reinforcing cord means lying in convolutions of triangular configuration; and FIGURE 8 is a plan view of still another embodiment of the present invention showing a restrictive tread component of the present invention embodying plies having reinforcing cord means lying in convolutions of diamond configuration.

Referring now to FIGURES 1 and 2 of the drawings there is shown a pneumatic tire 10 embodying a restrictive tread component 11 of the present invention formed of ply components 12 and 13 lying between the crown of the carcass 14 and the tread 15 of the tire. The carcass 14 may be of any known construction and may, for example, be of the so-called radial or zero angle construction characterized by being reinforced by cord means 17 lying in planes extending radially outwardly or substantially so of the axis of rotation indicated $x$—$x$ on FIGURE 2. The reinforcing cord means 17 of the carcass may be formed of any desired natural or synthetic fibers or material such as cotton, nylon, rayon and fiber glass or metals, or combinations of such fibers and materials, and may comprise mono-filament or multi-filament strands twisted or stranded together and, if desired, such strands may also, in turn, be reinforced. Further, the reinforcing cord means 17 may be coated or insulated with raw rubber or the like or uncoated as may be desired. Additionally, the reinforcing cord means 17 may, if desired, be of the cord or rope construction of United States Patent No. 3,133,584, dated May 17, 1964 to Ernest U. Lang and issued to the assignee of the present application. The particular carcass shown in FIGURES 1 and 2 is constructed in accordance with the principles of the invention of my co-pending application Serial No. 374,331, filed June 11, 1964, now Patent No. 3,240,250, and to which application reference may be had for a full and complete description of the illustrated tire carcass. The particular carcass shown is formed from continuous raw rubber carcass strip material 18 reinforced by the lengthwise extending reinforcing cord means 17, as shown in FIGURE 1.

The carcass 14 embodies a pair of conventional bead rings 19 and 20 disposed in spaced apart relation axially of the rotational axis $x$—$x$ of the tire 10. The strip material 18 extends in circumferentially successive outer and inner layers A and B, respectively, between the bead rings 19 and 20 to form a substantially torus body. The strip material 18 for the carcass preferably is uninterrupted beginning with one free end and continuing to its other end so that there are but two ends of the material in the completed torus body. The strip material 18 extends radially outwardly of and between the bead rings 19 and 20 in circumferentially successive first outer layers A which may be considered as extending from the center line of the inner periphery of the bead ring 19 to the center line of the inner periphery of the bead ring 20 at a first slight angle as, for example, of the order of 2°, to a plane extending radially outwardly from the axis of rotation $x$—$x$ of the tire and in circumferentially successive second inner layers B in superposed relation with respect to layers A, and which layers B may be considered as extending from the center line of bead ring 20 to the center line of the inner periphery of bead ring 19, again at a second slight angle of the order noted to the aforementioned radial plane but in the opposite direction to the angle of the first outer layers A. The torus body thus defined by layers A and B has a crown portion indicated at 22 lying radially outwardly of the bead rings 19 and 20 and inwardly of the inner surface of tread 15 of the tire.

It is preferable in constructing the above carcass to abut adjacent side edges of the strip material 18 of circumferentially successive outer and inner layers A and B, respectively, at the bead rings. In such relationship of the strip material and with the material being layed at the angle afore-indicated, the adjacent opposed side edges of circumferentially successive outer layers A and B diverge away from each other in a direction extending from the bead rings toward the crown of the carcass. The carcass above described is thus of the nature of a variation or modification of a zero or radial angle tire although departing from the latter in its true form in that in the true radial or zero angle tire the reinforcing cords lie in true planes extending radially outwardly of the axis of the tire. It will be understood that the restrictive tread components of the present invention have utility for use with torus radial angle tires or variations thereof other than as above described as well as in any tire structure in which it is desirable to restrict or control tire growth and for effecting desired road engaging characteristics of the tire tread.

In constructing the aforementioned tire, a carcass as described as above has a restrictive tread component of the present invention such as defined by the plies 12 and 13 formed into annular configuration and arranged to lie between the crown of the carcass and the adjacent inner surface of the tread 15. In the embodiment illustrated the plies 12 and 13 as shown are disposed in laterally offset superposed overlapping relation so that the portions of the carcass at the crown at opposite sides of a mid-plane which extends perpendicular or normal to the axis of rotation $x$—$x$ of the tire and lies centrally between the bead rings 19 and 20, as indicated at $y$—$y$ in FIGURES 1 and 2 are reinforced by multiple crossing portions of the reinforcing cords of each of the plies 12 and 13 to prevent radial tire growth of the tire at such portions of the carcass crown. The tire may be completed by the incorporation of side walls and the assembly may then be cured in accordance with conventional practices to complete the tire.

In the tire 10 embodying a restrictive tread component defined by the superposed laterally offset plies 12 and 13 the tire when cured will be flexible to road pattern deformation but the crossing overlap portions of the plies 12 and 13 at opposite sides of the aforementioned mid-plane of the tire offer substantial resistance to radial growth of the tire.

As best seen in FIGURES 3 and 4 the plies 12 and 13 above shown comprise reinforcing cord means which may be of any of the aforedescribed materials forming the reinforcing cord means 17 for the carcass of the tire, and which cord means in each of the plies 12 and 13 is arranged to lie in a plurality of circumferentially successive and serially connected overlapping circular convolutions. In the embodiment shown in FIGURES 3 and 4 the circular convolutions of each of the plies 12 and 13 are of the same diameters. Also, as noted, the plies 12 and 13 are disposed in superposed relation with the inner edge portions of each from opposite sides of the tire being disposed in overlapping relation to thus provide a restrictive tread component in which the plies 12 and 13 are disposed in superposed laterally offset relation providing for substantially reinforcement of a tire carcass at the aforementioned mid-plane of the tire. As indicated in FIGURE 4 the opposite ends of each of the annular plies 12 and 13 are adapted to be abutted in mating relation so that the convolutions extend substantially uniformly in overlapping relation around the entire circumference of the carcass. Preferably, each of the plies 12 and 13 is formed from a single continuous length of suitable cord reinforcing material but of course, if desired, they may be constructed of more than a single length of such cord reinforcing material. It will be understood that the cord reinforcing material of the plies 12 and 13 may be insulated with a coating of raw rubber or the like, or if desired the reinforcing cord material may be mounted on a sheet of uncured rubber or other suitable material of appropriate size for forming the ply, or, if desired, the wound reinforcing cord material may be disposed between a pair of sheets of such raw rubber material. In a laminated ply of the character last referred to, the reinforcing cord material need not be coated or insulated, but may be embedded in the aforementioned sheet or sheets forming the laminated ply. Upon completion of the winding of the reinforcing cord of a suitable length to form a ply, the wound member may then be formed into annular configuration with opposite ends of the reinforcing cord means and/or sheets disposed in the aforementioned mating relation. In constructing a tire embodying the restrictive tread component above described and also with regard to the restrictive tread components hereafter described, one ply, as for example, ply 12 may be applied and assembled with the tire carcass and thereafter the ply 13 assembled in the aforedescribed offset relation with respect to the ply 12 and about the circumference of the tire carcass followed by the conventional steps in the art of then completing the tire by applying the side walls and tread.

Referring now to FIGURE 5, there is shown another restrictive tread component of the present invention embodying first and second plies 20 and 22 conforming to the arrangement of plies 12 and 13 as above described, and with which a third ply 23 is disposed in overlapping relation with respect to the plies 20 and 22 and being positioned in symmetrical relation to the aformentioned mid-plane of the tire in which the restrictive tread component is embodied.

Referring now to FIGURE 6 there is shown still another form of restrictive tread component of the present invention again embodying a pair of plies 24 and 26 conforming to plies 12 and 13, and in which a third ply 28 defined by reinforcing material disposed in circular convolutions but of larger diameter than the diameters of the circular convolutions of plies 24 and 26. The third ply 28 again is disposed in superposed overlapping relation with respect to plies 24 and 26 and symmetrical with respect to the aforementioned mid-plane of a tire.

Referring now to FIGURE 7 there is shown a restrictive tread component comprising three plies 30, 32 and 34. The plies 30 and 32 are defined by reinforcing cord means lying in a plurality of circumferentially successive and serially connected overlapping convolutions of acute angled triangular configuration, and in which the bases 35 and 36 thereof extend transversely of the tire carcass, and with the apices of the sides 37 and 38, and 39 and 40 of the sides thereof respectively extend in one direction circumferentially of the tire. The two plies 30 and 32 are laterally offset with respect to each other so that inner side portions thereof inwardly of the side walls of the tire are disposed in overlapping relation. The aforementioned restrictive tread component 34 is also defined by reinforcing cord means lying in a plurality of circumferentially successive and serially connected overlapping convolutions of acute angled triangular configuration with the bases 42 thereof again extending transversely of the tire carcass and with the sides 43 and 44 thereof extending toward each other to provide apices extending circumferentially of the carcass in the opposite direction of the apices of the plies 30 and 32. It will be noted that the ply 34 is disposed in superposed overlapping relation with respect to the plies 30 and 32 and in symmetrical relation with respect to the latter and of the mid-plane of the tire in which the restrictive tread component is to be embodied. The triangular convolutions of the third ply 34 are all alike and similar to the convolutions of the plies 30 and 32 but of larger dimension.

In FIGURE 8 there is shown another form of restrictive tread components of the present invention embodying a pair of plies 44 and 45 each formed of cord reinforcing material disposed to lie in a plurality of circumferentially successive and serially connected overlapping convolutions of diamond configuration. It will be noted that the plies 44 and 45 are disposed in superposed relation with the opposed inner side edge portions of each in overlapping relation whereby the pair of plies are disposed in superposed laterally offset relation with respect to each other to provide for maximum strength of the restrictive tread component at the mid-plane of the tire in which it is incorporated. Again, the reinforcing cord means of the plies 44 and 45 may be composed of any of the aforementioned materials rubber coated or not and/or embedded and/or incorporated with one or more raw rubber sheets, it being understood that the opposite ends of each of the two plies 44 and 45 are disposed in mating or nested relation. Preferably the major axes of the diamond convolutions extend circumferentially of the carcass.

In the several restrictive tread components aforedescribed, they are preferably incorporated or associated with the carcass of a tire by being separately and successively applied in the order described and shown in the drawings with respect to each other at the outer circumference of the tire carcass.

While there has been shown and described certain preferred embodiments of the invention, it will be understood that various modifications and rearrangements may be made therein without departing from the spirit and scope of the invention.

The invention claimed is:

1. A restrictive tread component for incorporation between the carcass and tread of a pneumatic tire comprising a first annular ply defined by first cord means lying in a plurality of first circumferentially successive and serially connected convolutions, each of said first serially successive convolutions being in overlapping relation with more than one of said first serially successive convolutions, a second annular ply defined by second cord means lying in a plurality of second circumferentially successive and serially connected convolutions, each of said second serially successive convolutions being in overlapping relation with more than one of said second serially successive convolutions, and said first and second plies being disposed in superposed laterally offset relation with respect to each other.

2. A restrictive tread component for incorporation between the carcass and tread of a pneumatic tire comprising a first annular ply defined by first cord means lying in a plurality of circumferentially successive and serially connected overlapping convolutions, a second annular ply defined by second cord means lying in a plurality of circumferentially successive and serially connected overlapping convolutions, said first and second plies being disposed in superposed laterally offset relation with respect to each other, and a third annular ply defined by cord means lying in a plurality of circumferentially successive and serially connected overlapping convolutions disposed in superposed relation with respect to said first and second annular plies.

3. A restrictive tread component for incorporation between the carcass and tread of a pneumatic tire comprising a first annular ply defined by first cord means lying in a plurality of first circumferentially successive and serially connected circular convolutions, each of said first serially successive convolutions being in overlapping relation with more than one of said first serially successive convolutions, a second annular ply defined by second cord means lying in a plurality of second circumferentially successive and serially connected circular convlutions, each of said second serially successive convolutions being in overlapping relation with more than one of said second serially successive convolutions, and said first and second annular plies being disposed in superposed laterally offset relation with respect to each other.

4. The restrictive tread component of claim 3 characterized by said circular convolutions of said first and second plies being of the same diameters.

5. The restrictive tread component of claim 2 characterized by each of said convolutions of said first and second plies being alike and each of said convolutions of said third ply being alike and similar to said convolutions of said first and second plies.

6. The restrictive tread component of claim 2 characterized by each of said convolutions of said first, second and third plies being alike.

7. The restrictive tread component of claim 2 characterized by each of said convolutions of said first, second and third plies being circular and of the same diameters.

8. A restrictive tread component for incorporation between the carcass and tread of a pneumatic tire comprising a first annular ply defined by first cord means lying in a plurality of circumferentially successive and serially connected overlapping convolutions of acute angled triangular configuration having the bases thereof extending transversely of said carcass and with the apices of the sides thereof extending in one direction circumferentially of said carcass, a second annular ply defined by second cord means lying in a plurality of circumferentially successive and serially connected overlapping convolutions of acute angled triangular configuration having the bases thereof extending transversely of said carcass with the apices of the sides thereof extending in said one direction circumferentially of said carcass, said first and second annular plies being disposed in superposed laterally offset relation with respect to each other, and a third annular ply defined by third cord means lying in a plurality of circumferentially successive and serially connected overlapping convolutions of acute angled triangular configuration having the bases thereof extending transversely of said carcass and the apices of the sides thereof extending circumferentially of said carcass in a direction opposite the direction of said apices of said first and second annular plies, and said third annular ply being disposed in superposed relation with respect to said first and second annular plies.

9. A restrictive tread component for incorporation between the carcass and tread of a pneumatic tire comprising a first annular ply defined by first cord means lying in a plurality of first circumferentially successive and serially connected convolutions of diamond configuration, each of said first serially successive convolutions being in overlapping relation with more than one of said first serially successive convolutions, a second annular ply defined by second cord means lying in a plurality of second circumferentially successive and serially connected convolutions of diamond configuration, each of said second serially successive convolutions being in overlapping relation with more than one of said second serially successive convolutions, and said first and second annular plies being disposed in superposed laterally offset relation with respect to each other.

10. The restrictive tread component of claim 8 characterized by said convolutions of said first and second plies being alike, and said convolutions of said third ply being similar to but greater than the convolutions of said first and second plies.

11. The restrictive tread component of claim 9 characterized by the major axes of said diamond convolutions of said first and second plies being disposed to extend circumferentially of said carcass.

(References on following page)

References Cited by the Examiner

UNITED STATES PATENTS

| | | | |
|---|---|---|---|
| 1,058,433 | 4/1913 | Huckstep | 152—205 X |
| 1,636,978 | 7/1927 | Anderson | 152—207 |
| 3,024,828 | 3/1962 | Smith et al. | 152—361 X |

FOREIGN PATENTS 779,159  7/1957  Great Britain.

ARTHUR L. LA POINT, *Primary Examiner.*

C. W. HAEFELE, *Assistant Examiner.*